Dec. 14, 1943.     H. B. HULL     2,336,733
REFRIGERATING APPARATUS
Filed April 28, 1939
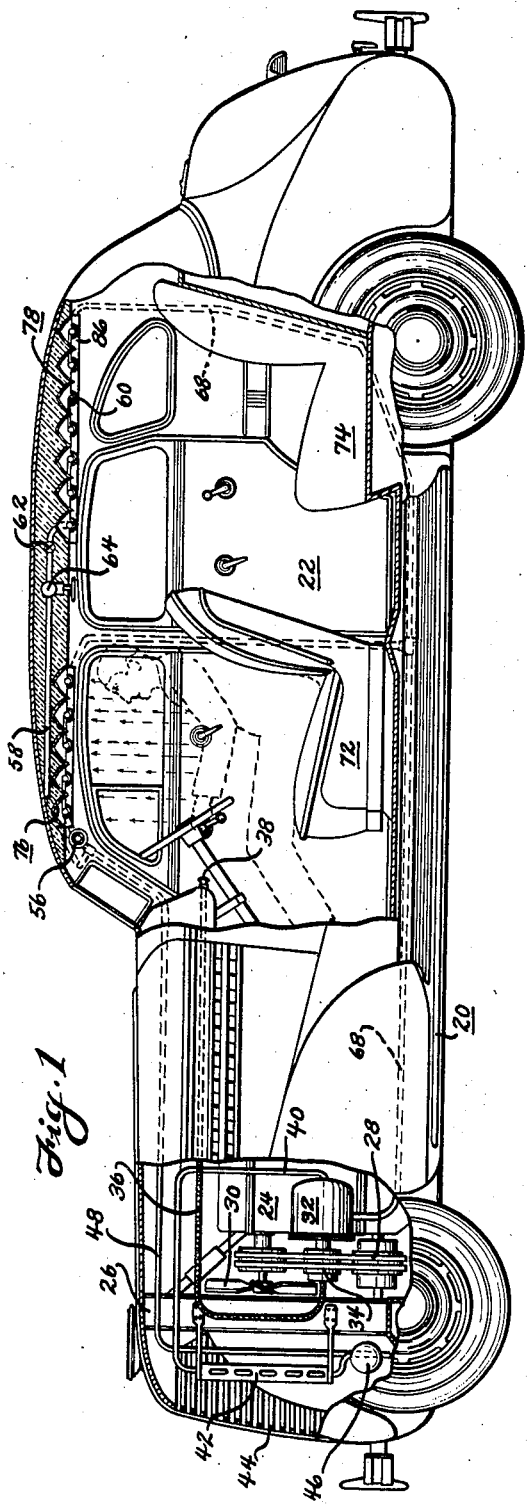
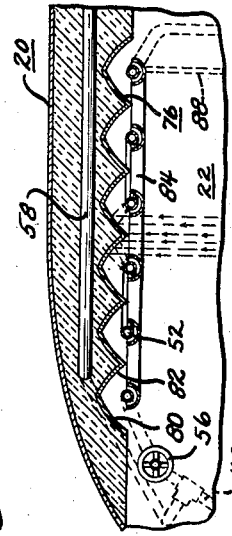
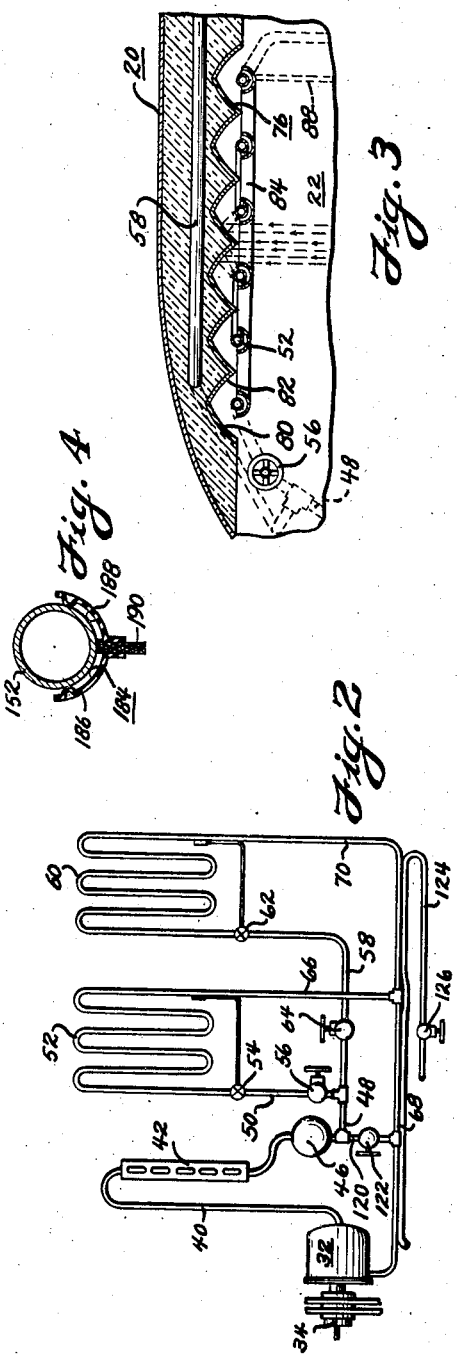
INVENTOR.
BY Harry B Hull
Spencer Hardman and Fehr
ATTORNEYS Patented Dec. 14, 1943

2,336,733

UNITED STATES PATENT OFFICE 2,336,733

REFRIGERATING APPARATUS

Harry B. Hull, Dayton, Ohio, assignor to General Motors Corporation, Dayton, Ohio, a corporation of Delaware Application April 28, 1939, Serial No. 270,552

6 Claims. (Cl. 62—117)

This invention relates to refrigerating apparatus and more particularly to methods of and apparatus for cooling the occupants of motor vehicles.

It has been found that air conditioning in motor vehicles in the usual manner requires too large a refrigerating system for extensive application. The cooling of the car in that manner requires the closing of the car and it is also desirable to insulate the car. Most cars are not provided with adequate insulation for this purpose and therefore such a system is not readily applicable to ordinary cars. Also the closing of the car deprives the car and the passengers of natural cooling by ventilation. With such a system it is also necessary to cool a relatively large volume if fresh air is required because of the relatively small space within the car. Furthermore, many persons desire free ventilation in the car during the summer time and therefore object to the car being closed up.

It is therefore an object of my invention to provide a cooling system for a vehicle in which it is not necessary to keep the car closed and in which the cooling actually supplements the natural cooling provided by the free ventilation which can be provided in a vehicle.

It is still another object of my invention to provide a method of and means for effectively applying radiant cooling to the occupants of a vehicle.

It is another object of my invention to provide means for efficiently transmitting heat from the bodies of passengers of a vehicle to evaporating means by the directed transmission of radiant heat and at the same time preventing the transmision of heat from other sources to the evaporating means.

It is still another object of my invention to provide means for causing the radiant heat emitted by the occupants of the vehicle to be converged upon a refrigerating element.

It is still another object of my invention to provide a radiant cooling unit which will attract radiant energy without appreciably cooling the air.

Further objects and advantages of the present invention will be apparent from the following description, reference being had to the accompanying drawing, wherein a preferred form of the present invention is clearly shown.

In the drawing:

Fig. 1 is a side view partly in section of a motor car embodying one form of my invention;

Fig. 2 is a diagrammatic view of the refrigerating system shown in Fig. 1;

Fig. 3 is an enlarged sectional view of a portion of the radiant cooling means shown in Fig. 1; and Fig. 4 is an enlarged sectional view of a portion of one of the refrigerant conduits together with a modified form of drip collecting and disposing means.

Briefly, I have provided a motor car with a radiant cooling system including serpentine evaporating means arranged in the top of the car and provided with reflectors which converge the radiant heat emitted by the occupants of the car upon the serpentine tubing containing the refrigerant. The tubing containing the refrigerant is provided with drip troughs which prevent the evaporating means from expending its refrigerating capacity in cooling air in the car. The evaporating means are supplied with liquid refrigerant from a compressor which is driven by a double constant speed fan belt and connected to a condenser which is located ahead of the radiator at the front of the car. The operation of the compressor is controlled by a clutch manually operated from the dash of the car.

Referring now to the drawing, there is shown a motor car 20 provided with a passenger compartment 22 and a gasoline engine 24. The gasoline engine is provided with a radiator 26, and a two-belt constant speed driving pulley 28 is provided upon the front end of the crankshaft for driving the fan 30 which draws the air through the radiator 26. The constant speed drive pulley 28 drives the fan 30 at a substantially constant speed at all times, since it has been found that the cooling by the fan is only required at the lower car speeds. The rotary compressor 32 is also provided with a two-belt pulley 34 which is driven by the same two belts from the constant speed pulley 28. The belts are of the V-belt type and provide adequate frictional engagement with the pulley 34 to drive the compressor 32.

The pulley 34 has a manually operated clutch incorporated within it which clutches the pulley 34 with the drive shaft of the compressor 32. This clutch incorporated in the pulley 34 is operated by a wire or cable which is encased in a metal tubular casing 36 which extends to the dash in the passenger car 22 and is provided with an operating knob 38 by which the clutch in the pulley 34 may connect the pulley 34 to drive the compressor 32. The compressor 32 compresses evaporated refrigerant which is withdrawn from the evaporating means and forwards the compressed refrigerant through the supply conduit 40 to a condenser 42 located ahead of the radiator 26 behind the grille 44 at the front of the car.

The compressed refrigerant is condensed in the condenser 42 by the air which flows through the condenser 42 and a radiator 26 under the influence of the air pressure existing at the front of the car by reason of the motion of the car and also by the air which is drawn through the condenser and radiator by the fan 30. The liquid refrigerant within the condenser 42 is collected in receiver 46 and is forwarded through the supply conduit 48 and a branch conduit 50 to a refrigerant evaporating means 52. This refrigerant evaporating means 52 is in the form of a serpentine coil extending across a vehicle and located in the top thereof. The flow of refrigerant through this evaporating coil 52 is controlled by a thermostatic automatic expansion valve 54 which is provided with a thermostat bulb located on the outer portion of the evaporating means 52. The supply conduit 50 is also provided with a hand valve 56 which is conveniently located for shutting off the evaporating means 52 independently of the refrigerating system.

A second branch supply conduit 58 supplies a second evaporating means 60 with refrigerant. A thermostatic automatic expansion valve 62 controls the flow of refrigerant into the evaporating means 60. This valve 62 also has a thermostat bulb located on the outer portion of the evaporator 60. The supply conduit 58 is also provided with a conveniently located hand valve 64 by which the flow of refrigerant to the evaporating means 60 may be controlled independently of the operation of the remaining portion of the refrigerating system. If desired, separate evaporating means may be provided for the space occupied by each occupant of the vehicle.

The evaporated refrigerant from the evaporating means 52 is withdrawn through the branch return conduit 66 and common return conduit 68 to the compressor 32 while the evaporated refrigerant from the evaporating means 60 is returned through the branch return conduit 70 and the common conduit 68.

The evaporating means 52 is located in the top of the passenger compartment 22 substantially directly above the front seat 72. The evaporating means 60 is located in the top of the passenger compartment substantially above the rear seat 74. These evaporating means are so located as to best receive the radiant heat emitted by the occupants of the front and rear seats of the car. A reflecting system is provided above each of the evaporators 52 and 60. The reflecting means for the evaporating means 52 is designated by the reference character 76 while the reflecting means for the evaporator 60 is designated by the reference character 78.

Each of these reflecting means incorporates a section for each pass of serpentine tubing in the evaporating means. Each of these sections are in two halves. For example, the first section has a front half designated by the reference character 80 and a rear half designated by the reference character 82. These halves are so shaped that the radiant heat emitted by the occupants will be reflected by each of these halves to converge onto the first pass of the serpentine refrigerant coil to the evaporating means. Similar converging reflecting sections are provided for each pass of each of the evaporating means. If desired, the evaporating means could be made of only a single pass. Or, a parabolic reflector with a cone-shaped coil could be provided for each occupant, if desired.

If the evaporating means were freely exposed to the air in a passenger compartment 22 a considerable amount of the refrigerating capacity would be expended in transferring heat from the refrigerating coils to the air in and flowing through the passenger compartment 22. In order to prevent this I have provided drip troughs 84 and 86 which are spaced from and enclose the lower half of the serpentine tubing forming the refrigerant evaporating means. These drip troughs are located beneath the tubing so as to catch any drip from the evaporating means. The condensate collecting in the troughs may be drained by the drain conduit 88. These troughs will also trap the air cooled by the evaporating means and prevent its circulation. It will also prevent the cooling of the air in the car by direct conduction since the air space between the tubing and the drip trough will provide a barrier against this type of heat transfer. The inside of the troughs may be provided with a reflecting surface in order to reflect radiant heat onto the refrigerant tubing.

The upper half of the serpentine tubing is exposed so as to directly receive the radiant heat reflected by the reflecting means. Each of the reflecting means generally forms a corrugated member in which the projections extend between the passes of the tubing so as to prevent any great amount of air from gaining access to the top half of the serpentine tubing. By so reducing the amount of refrigeration expended in cooling the air by the conduction and convection, the refrigerating capacity of the system is largely applied to cooling by radiation. Cooling by radiation makes it possible to permit free ventilation of the car and since under normal circumstances this ventilation provides a certain amount of natural cooling, the cooling by radiation need not supply all the necessary cooling but only an amount of refrigeration necessary to add to the natural cooling provided by the normal ventilation of the car. The amount of radiation cooling which can be accomplished is not greatly influenced by the amount of ventilation provided.

In Fig. 4 is shown a modified form of drip trough arrangement in which a drip trough, generally designated by the reference character 184, is applied to the refrigerant tubing designated by the reference character 152. The drip trough 184 is made of two sections 186 and 188 which are formed of either soft or hard rubber as desired. Each of these sections are provided with projections or dimples which extend toward the tubing 152 and serve to space the sections 186 and 188 away from the tubing 152, to permit the flow of water of condensation between the tubing 152 and the sections 186 and 188. Between the two sections 186 and 188 there extends along the pipe cotton or felt wicking 190 which is held between the two adjacent flanged edges of the sections 186 and 188 by rivets, stitching or other suitable means. This wicking 190 extends upwardly into contact with the bottom of the tubing 152 so that moisture from the tubing 152 may collect at the top of the wick and flow downwardly through the wicking 190.

The air passing over the lower end of the wicking 190 will evaporate the condensate which is collected in the trough 184 and which saturates the wicking 190. When the refrigerating system is used it is contemplated that in order to keep the car cool there will be ventilation employed sufficient to evaporate the condensate from the wicking. The trough 184 may be clamped to the tubing by suitable clamps at different points and may follow the convolutions of the serpentine tubing. If desired, the sections 186 and 188 may be made of a fibrous material or some sort of material which may act as a wick, such as cotton or felt. The rubber or these other materials will prevent the heat transfer from the tubing downwardly by convection and conduction since they will have an insulating effect. However, if desired, the sections 186 and 188 may be made of metal so that they will aid in the cooling by radiation.

The refrigerating system may be readily started and stopped at will by the operation of the knob 38 which controls the clutch in the compressor driving pulley 34. The amount of refrigeration provided for each of the evaporating means 52 and 60 may conveniently be controlled by the hand valves 56 and 64. The passengers may provide as much ventilation for the passenger compartment as they desire. The refrigerating system will provide as much radiant cooling as they desire in addition to the cooling provided by the ventilation. Thus this method of cooling makes it unnecessary to keep the car closed and thereby provide more natural and healthful air conditions in the car.

I have also provided means whereby the evaporating means and the adjacent portions of the refrigerating system may be converted to a secondary circuit type of radiant heating system for winter conditions. For this purpose I have provided a short conduit 120 connecting the bottom of the receiver 46 with the suction conduit 64 so that the liquid refrigerant will drain into the suction conduit 64. A valve 122 is provided in the short conduit 120 for closing the short conduit when the system is used for refrigeration. It also may be closed after the receiver is drained for heating purposes. A water coil 124 connected to the outlet of the water pump or the radiator connection of the engine 24 is employed for heating and evaporating the refrigerant in the suction conduit 64. This water coil 124 extends along and in direct thermal heat exchange relation with the suction conduit 68 and is provided with a hand valve 126 for shutting off the flow of water through the coil.

In operation, the valve 122 is opened to drain the receiver 46 and to flood the suction conduit after which the valve 122 may be either left open or closed. The valve 126 is then opened to allow the hot water from the engine 24 to circulate through the hot water coil 124 to heat and evaporate the refrigerant in the suction conduit 64. The evaporated refrigerant rises in the branch suction conduits 66 and 70 to the evaporating means 52 and 60 which become condensers or radiators for the secondary circuit heating system. The hot refrigerant vapor heats the evaporating means 52 and 60 thereby radiating heat onto the reflecting means 76 and 78 and this radiant heat is reflected onto the occupants of the car.

While the form of embodiment of the invention as herein disclosed, constitutes a preferred form, it is to be understood that other forms might be adopted, all coming within the scope of the claims which follow.

What is claimed is as follows:

1. Refrigerating apparatus including radiant cooling means comprising tubular refrigerant conducting means, drip troughs surrounding substantially the lower half of and spaced from the tubular means, and reflector means surrounding substantially the upper half and spaced from the tubular means for reflecting radiant energy onto the tubular means.

2. Refrigerating apparatus for an enclosure including radiant cooling means, converging reflecting means for converging radiant energy from said enclosure upon the cooling means, means for collecting water of condensation upon the cooling means, and means for evaporating said water of condensation in said enclosure so as to cool said enclosure.

3. The method of cooling the occupants of a vehicle by means of a limited capacity cooling system which comprises freely ventilating the vehicle, shielding said cooling system from the ventilating air, absorbing radiant heat from the occupants of a plurality of zones in the vehicle by said system without substantially cooling the air, and limiting the cooling effect to only one of said zones when only the one zone is occupied.

4. Air conditioning apparatus for occupants of a single passenger compartment of a vehicle comprising in combination, a plurality of radiant heat absorbing means disposed adjacent passenger spaces of said compartment for producing localized cooling, heat dissipating means for dissipating heat absorbed by said radiant heat absorbing means, means for selectively and independently controlling the operation of each of said radiant heat absorbing means whereby the cooling effect may be localized when only a portion of the passenger compartment is in use.

5. Refrigerating apparatus including radiant cooling means comprising refrigerating means, drip troughs disposed beneath said refrigerating means, and reflector means disposed above said refrigerating means for reflecting radiant energy onto the refrigerating means.

6. Refrigerating apparatus including radiant cooling means comprising refrigerating means, drip troughs disposed beneath said refrigerating means, and reflector means disposed above said refrigerating means for converging and reflecting radiant energy onto the refrigerating means.

HARRY B. HULL.